Aug. 23, 1966  H. L. McCLELLAN  3,267,500
APPARATUS FOR FORMING HOLLOW ARTICLES
Filed Sept. 18, 1963   6 Sheets-Sheet 1

Fig. 1

INVENTOR.
HERBERT L. McCLELLAN
BY
RICHEY, McNENNY & FARRINGTON
H. F. McNenny
ATTORNEYS

United States Patent Office 3,267,500
Patented August 23, 1966

3,267,500
APPARATUS FOR FORMING HOLLOW ARTICLES
Herbert L. McClellan, Tiffin, Ohio, assignor to The National Machinery Company, Tiffin, Ohio, a corporation of Ohio
Filed Sept. 18, 1963, Ser. No. 309,787
13 Claims. (Cl. 10—76)

This invention relates generally to apparatus for forging articles and more particularly to a novel and improved apparatus for forming tubular articles such as nut blanks and the like without scrap.

In the illustration form of the present invention, a nut blank is cold formed without scrap. In this illustrated embodiment, the end portion of round wire stock is positioned within a die having a polygonal die cavity formed with a width across the flats substantially equal to the diameter of the stock. A punch having a diameter equal to the required diameter of the through passage in the final blank is then pressed into the end of the stock upsetting the stock into a polygonal shape and simultaneously backward extruding the upset stock around the punch forming a portion having a polygonal exterior surface and a blind bore or passage extending into the portion.

The punch is then removed and the pierced or punched portion is sheared from the stock to form the desired tubular article. The apparatus operates to position the stock so that the bottom of the blind passage is accurately located at the plane of shearing and the walls, both internal and external, are supported against distortion during the shearing operation. The blank is then progressively worked in subsequent dies to form the crowned end and washer face.

In the illustrated embodiment of this invention, the stock is cold worked. However, the invention is applicable for hot forming articles particularly when the articles are of large size or are formed of medium and high carbon steels, stainless steel and some non-ferrous alloys. Again, in some instances, the first operation is performed hot and the subsequent operations performed cold.

The nut blank produced at the first working station is sufficiently well formed to be threaded without additional forming operations and meets the specification requirements of some grades of nuts which do not require crowned ends or washer faces. This invention, therefore, makes it possible to completely form such grades of nut blanks at a single die station without scrap.

The nut blank, illustrated, is formed with a hexagonal peripheral shape. It should be understood, however, that it may be square or of other polygonal shape and that other tubular articles such as roller chain bushings, pipe couplings and the like, can be manufactured by apparatus incorporating this invention.

It is an important object of this invention to provide a novel and improved apparatus for forming tubular articles without scrap.

It is another important object of this invention to provide a novel and improved apparatus for upsetting and extruding a tubular article having a non-circular section in a single blank working station.

It is another important object of this invention to provide apparatus for forming tubular articles which includes the step of backward extruding a portion of stock to form a blind bore or passage in such stock followed by the step of shearing off the pierced portion of stock to form a tubular article.

It is another important object of this invention to provide a novel and improved extrusion and shearing mechanism for forming tubular articles from solid stock.

It is still another object to provide apparatus according to the preceding objects followed by subsequent working operations to produce a finished nut blank without scrap.

Further objects and advantages will appear from the following description and drawings wherein.

Figure 1:
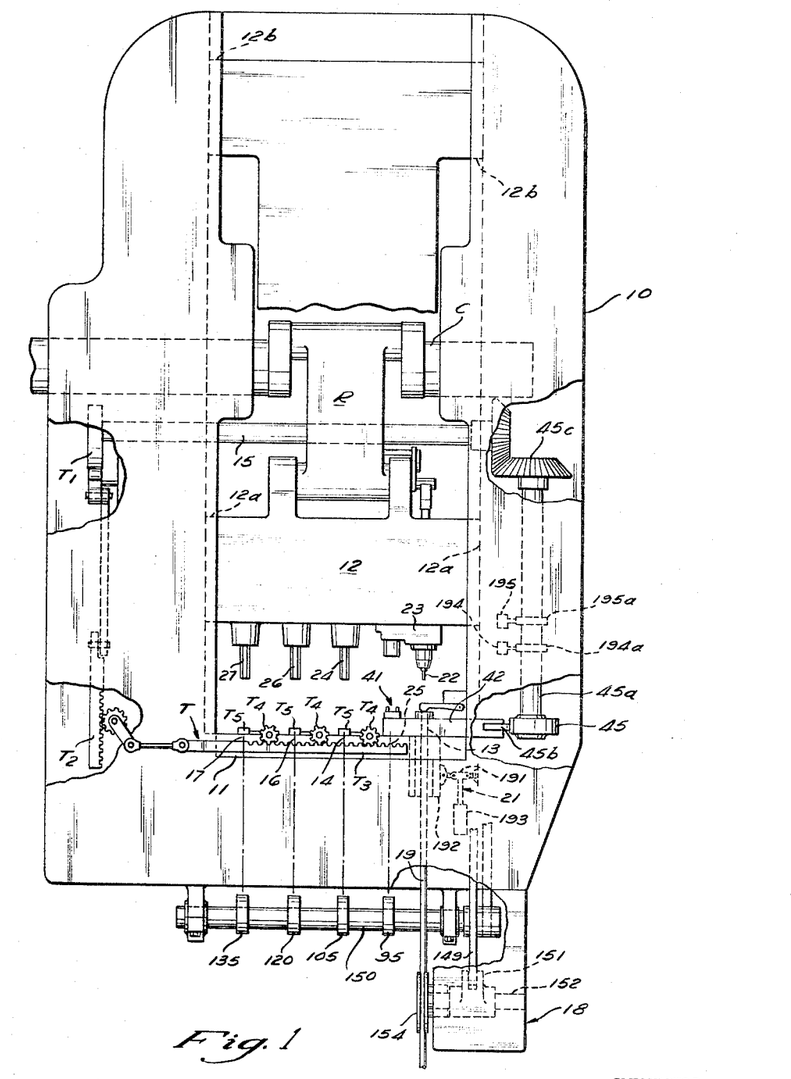
FIGURE 1 is a plan view of a machine for forming hollow articles incorporating this invention with some parts removed for purposes of illustration.

In FIGURE 1 a machine incorporating this invention is illustrated. The machine includes a frame 10 on which a die breast 11 is mounted. A slide 12, guided in bearings 12a and 12b, is reciprocable in the frame 10 between a forward position adjacent to the breast 11 and a rearward position spaced therefrom. The slide 12 is powered by a crank shaft C and connecting rod R drive. A flywheel (not shown) is mounted on the end of the crank shaft and is driven by a V-belt drive in a manner well known in the art.

Four blank working die stations 13, 14, 16 and 17 are located in the die breast 11 to progressively work the blank. The dies in the first die station 13 include a die element laterally movable between a closed position in which the stock is securely clamped and an open position in which the stock is free for feeding. The second, third and fourth die stations 14, 16 and 17, respectively, contain closed dies in which the nut blank is crowned, chamfers are formed and a washer face is produced. A feed mechanism 18, described below, is mounted on the frame 10 in alignment with the first die station 13 and operates to feed cylindrical wire stock 19 to the first die station in a manner timed with the operation of the machine.

A clamping mechanism 21 is connected to the movable die in the first die station 13 to close the dies for gripping the stock 19 during the working phases of the cycle and release or open the dies so that the stock can be freely fed by the feed mechanism.

A punch 22 is carried by a first tool holder 23 mounted on the slide 12 and is positioned to upset and extrude stock in the first die station 13. A tool 24 is mounted on the slide 12 in alignment with the second die station 14 and tools 26 and 27 are mounted in alignment with the third and fourth die stations 16 and 17 respectively, to perform the working operations at their associated die stations.

A shear and transfer mechanism 41 is mounted for movement between positions adjacent to the first die station 13 and a transfer station 25 and operates to shear off stock worked by the punch 22 in the first die station 13 and position the sheared stock or blank in the transfer station 25.

A transfer mechanism T is provided to transfer blanks progressively from the transfer station 25 to the second die station 14, from the second die station 14 to the third die station 16 and from the third die station 16 to the fourth die station 17. This transfer mechanism T is arranged to turn the blank end for end during each transfer operation. However, when transfer without turning is required, other transfer mechanism known in the art is used.

The transfer mechanism is operated by a cam $T_1$ on an accessory drive shaft 15 in a timed relationship to the operation of the slide 12 so that the blanks are transferred while the slide 12 and the tools supported thereby are spaced from the die stations. The shaft 15 is connected by suitable gearing (not shown) to the crank shaft C so that it rotates at the same speed as the crank shaft. The cam $T_1$ produces reciprocation of the two racks $T_2$ and $T_3$ which in turn drive the gears $T_4$ causing them to oscillate through 180°. Each gear $T_4$ is connected to drive a pair of transfer fingers $T_5$ back and forth to advance blanks progressively to the associated die stations. Reference may be made to the United States Patent to Friedman No. 2,542,864 dated February 20, 1951, for a detailed description of such a transfer mechanism. In this manner a blank is positioned and worked at each die station and a finished blank is produced during each cycle of the machine.

Figure 2:
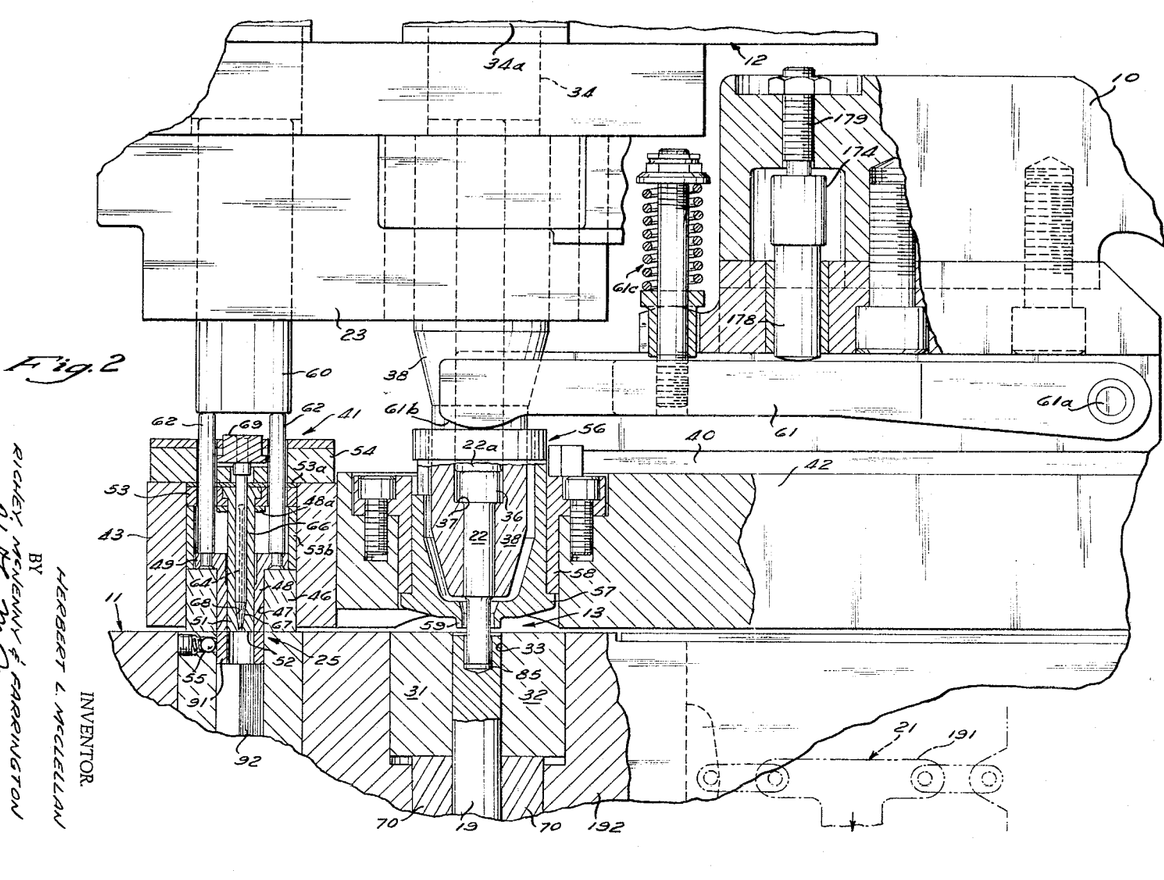
FIGURE 2 is an enlarged fragmentary section through the first die station and transfer station illustrating the first station dies and tools and the shearing mechanism.

Referring to FIGURE 2, fixed die element 31 and a laterally movable die element 32 are mounted on the die breast 11 at the first die station 13. The clamping mechanism 21 is connected to move the movable die element 32 between a closed position in which the stock 19 is tightly gripped and an open position in which the stock is free for axial feeding. The two die elements 31 and 32 cooperate when closed to define a die cavity 33 having a polygonal cross-section. In the illustrated embodiment, the die cavity 33 is hexagonal in cross-section with three sides of the cavity in each of the dies 31 and 32. The joint between the die elements 31 and 32 extends along opposite edges of the hexagonal cavity. Therefore, the flats of the die cavity are solid and the nut formed therein has smooth sides.

The rearward end of the punch 22 engages a drive pin 22a which is in turn seated agaist a spacer plate 34 positioned against a backup plate 34a in the slide 12. A head 36 on the rearward end of the punch 22 mates with a shoulder 37 in a mounting sleeve 38 secured in the tool holder 23.

The shear transfer mechanism 41 is mounted on a slide or carrier 42 for lateral movement along the die breast 11 between the first die station 13 and the transfer station 25. The carrier is supported for reciprocating movement between these two positions on bearing 40. To move the carrier 42, a cam 45 (illustrated in FIGURE 1) is mounted on the shaft 45a connected by gearing 45c to the shaft 15. A follower 45b journaled on the carrier 42 engages the cam 45 to produce the reciprocating movement. A spring (not shown) retains the follower in engagement with the cam.

Referring again to FIGURES 2 and 4, a cutter holder 43 secured to the carrier 42 supports the shear transfer mechanism 41. A hardened shear ring 46 mounted in the holder 43 is formed with a hexagonal cross-section passage 47 positioned in alignment with the die cavity 33 when the transfer mechanism is adjacent to the first die station 13 and in alignment with transfer station 25 when in the position illustrated in FIGURE 2. The passage 47 has substantially the same cross-section as the cavity 33 differing only in that clearance is provided to permit the entry of the stock upset and extruded in the cavity 33. The knockout sleeve 48 closely fits and extends into the passage 47 and is movable between a rearward position and the forward position illustrated. The rearward end of the knockout sleeve 48 is formed with a flange 49 which engages a mating surface on the ring 46 when the sleeve 48 is in the maximum forward position.

A stock gauge 51 extends into the knockout sleeve 48 and is positioned with its end face 52 in the alignment with the end face of the ring 46. The stock gauge 51 is supported by a plate 53 clamped between a spacer 53a and a spacer 53b by a backup plate 54. The backup plate 54 is bolted to the holder 43.

Extending through the backup plate 54 are knockout pins 62 which are riveted at their forward end to the knockout sleeve 48. A knockout operator 60 is mounted in the tool holder 23 to engage the knockout pins 62 and press the knockout sleeve 48 forward ejecting a nut blank from the passage 47 into the transfer station 25 when the slide 12 moves forward. A spring loaded ball retainer 55 frictionally engages the blanks in the transfer station 25 holding the blank in the proper position.

The stock gauge 51 is formed with an axially extending lateral slot 64 so that the stock gauge can be spread laterally into supporting engagement with the wall of the bore formed in the stock by the tool 22. To spread the stock gauge 51, a spreader pin 66 formed with a conical cam surface 67 at its forward end is mounted for axial movement within the stock gauge. The stock gauge 51 is formed with a mating cam surface 68 engaged by the surface 67 on the pin 66 to spread the forward end of the stock gauge 51 when the pin is pressed forward. A spreader pin bar 69 is slidably mounted on the backup plate 54 and is riveted to the rearward end of the pin 66. An operator lever 61 engages the bar 69 to press the pin 66 forward at the proper time in the cycle of the machine. Springs (not shown) are mounted to press the bar 69 rearward to normally maintain the pin 66 in its rearward position.

Figure 4:
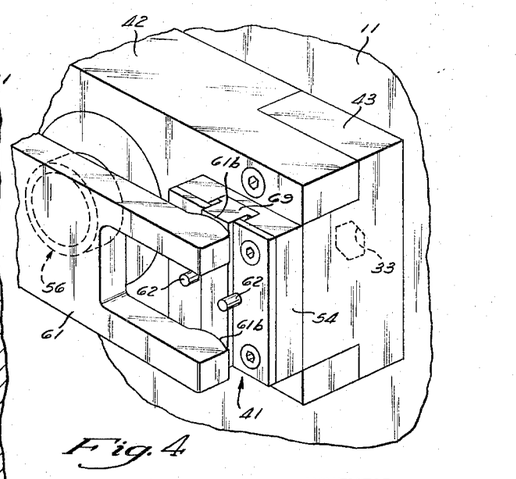
FIGURE 4 is an enlarged fragmentary perspective view of the first station illustrating the shear and transfer in a position in alignment with the first die station.

The operator lever 61 is pivoted at 61a on the frame 10 and is formed with a forked end, best illustrated in FIGURE 4. Each arm of the forked end is provided with a curved operating surface 61b with one positioned above and the other below the die station 13. When the carrier 42 shifts to position the shear and transfer 41 into alignment with the first die station 13 the operating surfaces 61b of the operating lever 61 engage the ends of the spreader bar 69, as illustrated in FIGURE 4. A spring assembly 61c (illustrated in FIGURE 2) normally maintains the lever 61 in the illustrated rearward position.

A reverse feed mechanism 56 is also mounted on the carrier 42 so that it is positioned in alignment with the first die station 13 when the shear and transfer mechanism 41 is in alignment with the transfer station 25. The reverse feed mechanism 56 includes an operating sleeve 57 slidably mounted in a bearing ring 58 mounted on the carrier 42. The forward end of the sleeve 57 is formed with a tubular flange 59 proportioned to allow passage of the punch 22 with clearance and also to fit into the die cavity 33 with clearance. The sleeve 57 is also proportioned to receive sleeve 38 with clearance. When the sleeve 57 is pressed forward so that the flange 59 extends into the cavity 33 the end of the flange engages the stock and pushes the stock back a predetermined distance behind the face of the dies. During this operation the clamping mechanism 21 is released to permit the stock to slide in a rearward direction.

The surfaces 61b on the operating lever 61 engage the end of the sleeve 57 when the sleeve is aligned with the die cavity 33 and at the proper point in the machine cycle press the sleeve toward the die to push the stock rearwardly therein. Therefore, the operating lever 61 functions at two different times in the cycle of the machine. First the operating lever pushes the sleeve 57 a predetermined distance to position the end face of the stock 19 back from the face of the dies 31 and 32 and later in the cycle the operating lever 61 is again operated to press the pin 62 down into the stock gauge 51 so that it tightly engages and supports the inner surface of the stock during the shearing of the hollow portion of the stock to form the initial blank.

Reference should now be made to FIGURES 3a through 3e which progressively illustrate the operations which occur at the first die station 13. At the beginning of the cycle as the punch 22 moves forward the stock 19 is in the position illustrated in FIGURE 3e with its forward end 81 flush with the face of the dies 31 and 32 and the dies are open to permit axial movement of the stock. During this portion of the cycle, as the punch 22 is moving toward the stock, the sleeve 57 is pressed forward to move the flange 59 into engagement with the end of the stock 81 and press the stock back from the face of the dies 31 and 32 to the position illustrated in FIGURE 3a. This occurs during the forward stroke of the punch but before the punch reaches the forward position. The sleeve 57 then returns to its initial position with the flange 59 spaced back from the face of the dies 31 and 32.

Figure 3A:
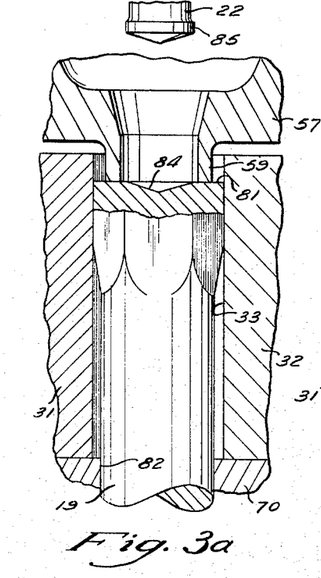
FIGURE 3a is an enlarged fragmentary section of the first die station illustrating the position of the elements when the stock is pressed back into the die and as the punch approaches the stock (the section is taken diagonally across the corners of the hexagonal section to better illustrate the blank and die shape)

During the retraction of the sleeve 57 the dies 31 and 32 are closed to support the stock and prevent lateral buckling movement thereof during piercing. Rearwardly of the dies 31 and 32 a pair of gripper segments 70 are provided which are also opened and closed by the clamp mechanism 21 to clamp the stock against rearward movement under the force of the punch during its piercing of the stock. The gripper elements 70 are preferably made relatively long so that they will provide a sufficiently large gripping area to prevent slipping without damaging the stock surface.

The forward end of the stock 19 has been upset to a polygonal shape by the previous cycle of operation and a shallow conical recess 84 produced by the end of the tool 22 is formed in the end face of the stock. A substantial portion of the stock contained within the polygonal die cavity 31 however, is not upset to the hexagonal shape and still retains the cylindrical or original rod shape. The diameter of the stock 19 is substantially equal to the width across the flats of the die cavity 33 so that the stock is supported against buckling.

Figure 3B:
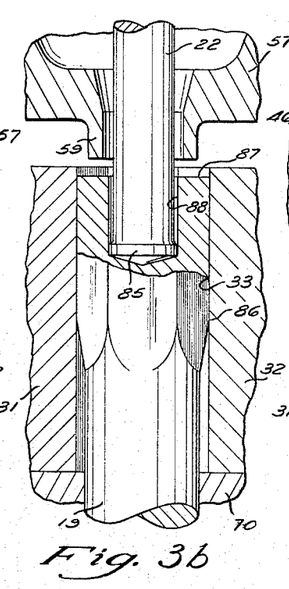
FIGURE 3b is a view similar to FIGURE 3a illustrating the position of the elements at the completion of the upsetting and extrusion operation.
Figure 3C:
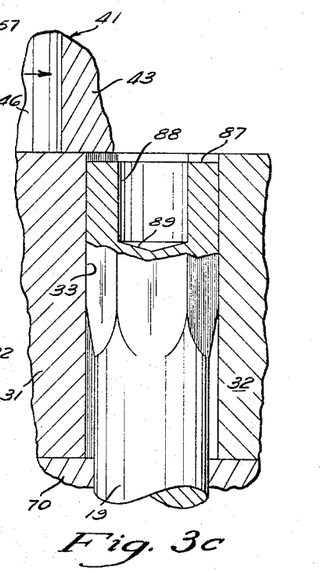
FIGURE 3c is a view similar to FIGURES 3a and 3b illustrating the position of the elements after the tool is removed from the stock and the shear is moving toward the position aligned with the die.

When the punch 22 enters the end of the stock, two simultaneous actions take place. The punch produces upsetting pressure on the stock within the polygonal die cavity 31 causing it to upset to a hexagonal shape ahead of the punch and at the same time backward or rearward extrusion takes place along the punch and die cavity until the condition illustrated in FIGURE 3b is reached. The punch 22 is formed with an extrusion land 85 to reduce the friction of extrusion.

A comparison of the two FIGURES 3a and 3b illustrates that the stock ahead of the punch is upset to a polygonal shape and that the length of the upset does not extend to the bottom of the polygonal die, but rather terminates at a zone 86. Due to the displacement causing the backward extrusion produced by the punch 22, the stock extends to an end face 87 closer to the end face on the dies. Since the material of the stock is upset to a polygonal shape ahead of the punch as illustrated, the backward flow of extrusion past the forward end of the punch 22 produces an extruded section having a well defined polygonal external surface and a clean, well shaped blind bore 88.

After the punching operation is completed, the punch 22 is carried back out of the blind bore 88 by the rearward movement of the slide 12. Thereafter, the die 32 is opened releasing the gripping force on the stock and the carrier moves the shear and transfer 41 into alignment with the die station 13.

Figure 3D:
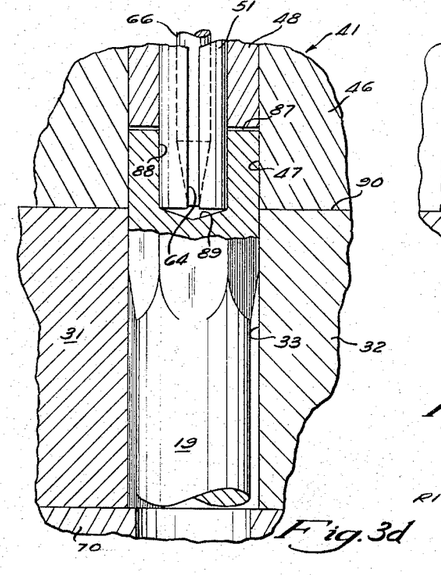
FIGURE 3d is a view similar to FIGURES 3a through 3c illustrating the elements when the shear is positioned in alignment with the die and after the stock is moved into the shear.
Figure 3E:
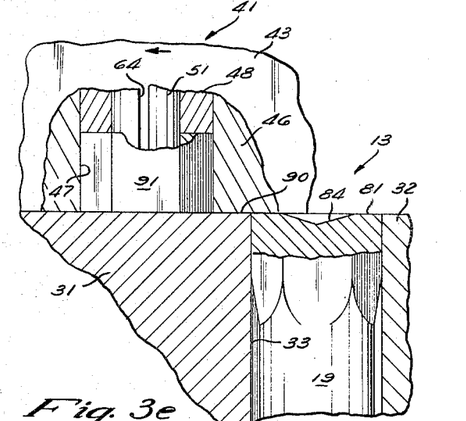
FIGURE 3e illustrates the elements in a position immediately after the shearing of the blank from the stock.

After the shear transfer mechanism 41 is positioned in alignment with the first die station 13, the stock 19 is moved forward by the feed mechanism 18 to the position illustrated in FIGURE 3d at which time a stock gauge 51 carried by the shear mechanism engages the end wall 89 of the blind bore 88. The end wall 89 of the blind bore 88 has a conical shape corresponding to the end of the punch 22 and the stock gauge 51 is formed with a flat or planar end. Therefore, the stock gauge engages the end wall only adjacent to the intersection between the end wall 89 and the side walls of the blind bore 88. The stock gauge is sized to fit the blind bore 88 with a minimum amount of clearance necessary for the feeding of the stock forward to the position of FIGURE 3d.

After the stock 19 is fed forward until it engages the stock gauge 51 as illustrated in FIGURE 3d, the pin 66 is driven forward by the lever 61 into the camming section expanding the stock gauge 51 into tight engagement with the inner wall of the blind bore 88 immediately adjacent the intersection thereof with the end wall 89.

The cutter ring 46 on the shear mechanism is positioned with its end face immediately adjacent to the end face of the dies 31 and 32 and cooperates with the dies 31 and 32 and the stock gauge 51 to constitute a shearing device having a shear plane 90 lying along the face of the dies. When the shear mechanism 41 is moved laterally from the position of FIGURE 3d, the tubular section of stock is sheared away to form a separate tubular blank 91 having a through bore and an external polygonal surface.

In order to prevent distortion and to achieve a smooth cut of the stock, the various elements are proportioned and arranged to support the stock on both sides of the shear plane 90. The shear plane 90 passes through the intersection of the side wall of the blind bore 88 and the bottom wall 89 so the stock on the die side of the shear plane is solid with the exception of the shallow conical recess of the end wall 89. Since the recess is shallow, it does not provide a weakness in the stock at the shear plane. The outer surface is supported by the dies 31 and 32 so distortion will not occur on the die side of the shear plane during the shearing operation. Even though the dies are open or unclamped, they provide this support since they move apart only a very small amount. Also the die element 31 closely supports the entire side of the stock in the direction of shearing so it cannot distort. The stock extending into the cutting ring 46 is supported adjacent to the shear plane along its outer surface by the wall of the polygonal opening 47 of the shear ring 46 and the inner surface of the bore 88 is supported by the stock gauge 51 so distortion of the stock of the blank 91 is prevented. The slot 64 is perpendicular to the direction of shear movement so the stock gauge 51 provides full support in the direction of the shearing forces.

In the illustrated embodiment the stock gauge 51 is used to gauge the forward feeding of the stock, but if desired knockout sleeve 48 may be used for that purpose. In such case the elements are proportioned so that the sleeve 48 bottoms against a bearing washer 48a limiting its rearward movement and engages the end face 87 to gauge the feeding of the stock.

In actual practice blanks sheared in this manner have been found to have substantially smooth faces and distortion produced by shearing is substantially non-existent. As the shearing mechanism 41 moves across the die breast to a position adjacent the transfer station 25, it passes through the intermediate position illustrated in FIGURE 3e. It should be noted that the stock 19 at the first die station 13 is again in the initial condition with the end face 81 aligned with the end face of the dies 31 and 32. When the shear mechanism 41 moves to the transfer station 25, the entire cycle is repeated with the sleeve moving forward to push the stock back into the die cavity 33. As the header slide 12 moves forward, operator 60 engages the pins 62 (illustrated in FIGURE 2) and operates to push the knockout sleeve 48 forward ejecting the blank 91 into the transfer station 25.

When the header slide 12 moves back from the die breast 11 and the shear and transfer mechanism 41 moves over to the first die station 13, an ejector pin 92 powered by a cam 95 on a cross-shaft 150 (illustrated in FIGURE 1) pushes the blank 91 out of the transfer station 25 into the associated transfer fingers T₅ which carry it to the second die station 14.

Figure 5:
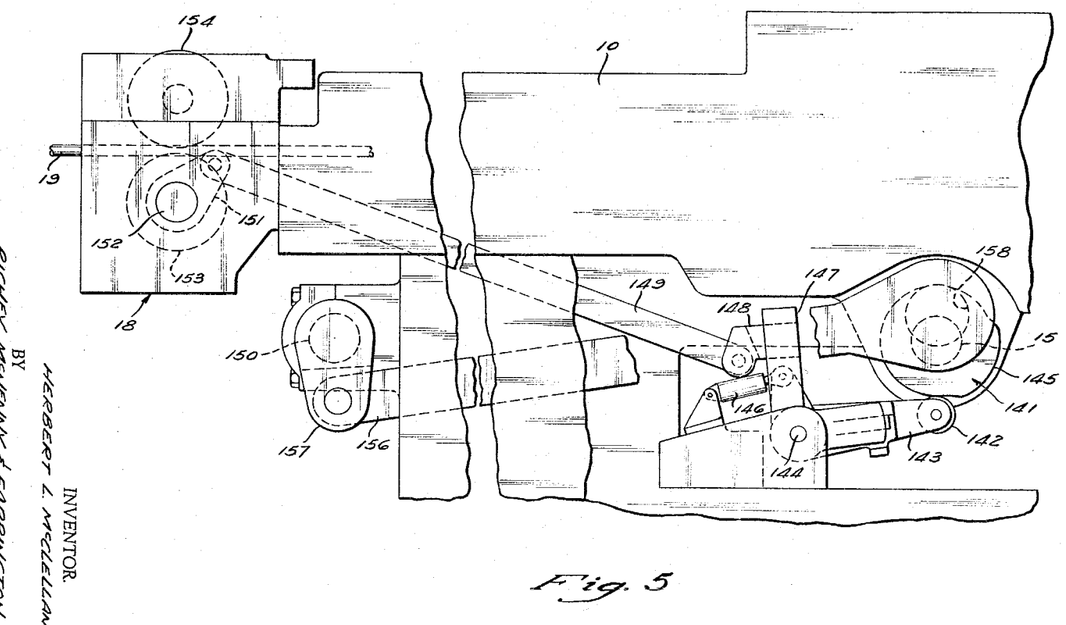
FIGURE 5 is an enlarged fragmentary side elevation of the feed drive and kickout drive with parts removed to simplify the understanding of the structure.

FIGURE 5 illustrates the drive for the feed mechanism 18 and the cross-shaft 150. Both of these drives are powered by the accessory drive shaft 15. A cam 141 is mounted on the accessory drive shaft 15 and is engaged by a cam follower 142 journaled on a follower arm 143. The follower arm 143 is pivoted on the frame 10 for oscillating movement around a pivot axis 144. A spring 146 is connected to the frame and a projection on the follower arm 143 biasing the follower arm 143 in a counter-clockwise direction maintaining the cam follower 142 in engagement with a cam 141. A second projection 147 is provided on the follower arm 143 extending upwardly above the pivot axis 144. Mounted on the projection 147 is a pivot block 148 vertically movable with respect to the follower arm 143 for adjustment of the feed. A pull rod 149 is pivoted at one end to the pivot block 148 and at its other end to an arm 151 journaled on a cross-shaft 152 which is in turn journaled on the housing of the feed mechanism 18.

A lower feed roll 153 is mounted on the cross-shaft 152 for engagement with the lower side of the stock 19 and cooperates with an upper feed roll 154 which engages the upper side of the stock 19 to feed the stock forward when the lower feed roll 154 is rotated in a clockwise direction, and the upper feed roll is rotated in a counter-clockwise direction. The two rolls are connected by gearing (not shown) for opposite rotation. The arm 151 is connected to the cross-shaft 152 by a conventional frictional clutch type feed box which prevents counter-clockwise rotation of the cross-shaft 152 relative to the arm 151 while permitting relative rotation in the opposite direction.

The cam 141 is provided with a lobe 145 which causes clockwise rotation of the follower arm 143 when the lobe moves under the follower 142. This causes the pull rod 149 to produce clockwise rotation of the lower feed roll 153 and counter-clockwise rotation of the upper feed roll 154 to feed the stock forward.

The cam 141 is also shaped so that the cam follower 142 is moving from the lobe 145 toward the lower dwell portion allowing counter-clockwise rotation of the follower arm 143 and the lower feed roll 153 as the stock is pressed back into the die by the sleeve 57 prior to the piercing operation. The rate of the cam induced movement of the drive linkage is such that the arm 151 is rotating in a counter-clockwise direction at a speed which is faster than the corresponding backward feed rate of the stock so that the overriding drive clutch does not engage and resist such movement. This eliminates any possibility of slip marks on the stock or excessive wear of the feed roll grooves. Since the distance the stock is moved rearward is always less than the distance the stock moves forward when it is fed into the cutter, slippage does not occur between the stock and the feed rolls.

The shaft 150 used to operate the knockouts is oscillated by a pull rod 156 journaled at one end on a lateral projection 157 on shaft 150. The other end of the pull rod 156 is journaled on an eccentric 158 on the accessory shaft 15, thus as the accessory shaft 15 rotates the cross-shaft 150 oscillates in timed relationship.

Figures 6, 7:
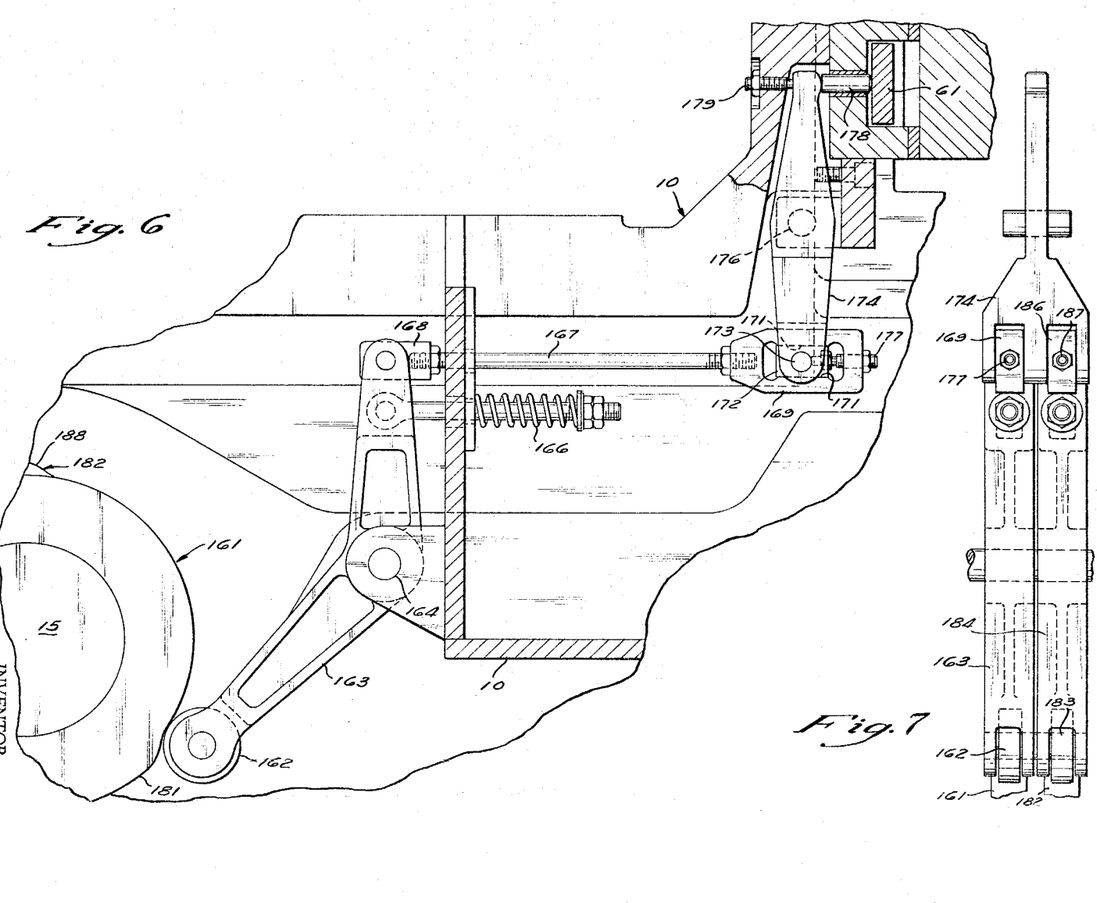
FIGURE 6 is an enlarged fragmentary side elevation of the drive linkage for operating the mechanism to push the stock back in the die and also clamp the shear after the stock is fed into the shear.
FIGURE 7 is an end view of the drive mechanism illustrated in FIGURE 6 with parts removed for purposes of illustration.

The drive linkage for the operating lever 61 is illustrated in FIGURES 6 and 7. Since the operating lever 61 must be actuated twice during the cycle two parallel drive linkages are utilized, each of which is individually adjustable. One linkage includes a first cam 161 mounted on the accessory drive shaft 15 and a cam follower 162 carried by a follower arm 163. The follower arm 163 is pivoted for oscillating movement at 164 on the frame 10 and is biased by a follower arm spring 166 in a clockwise direction to maintain the follower 162 in engagement with the cam 161. The upper end of the follower arm 163 is pivotally connected to one end of a pull rod 167 by a pivot block 168. The other end of the pull rod 167 is connected to a slide block 169 providing opposed bearing surfaces slidably engaging opposite sides of a bearing block 172. The bearing block is pivotally connected by a pivot shaft 173 to the lower end of a rocker arm 174, which is in turn pivoted at 176 on the frame 10. The right end (as viewed in FIGURE 6) of the bearing block 172 is engageable with an adjustment screw 177 threaded into the end of the slide block 169.

The upper end of the rocker arm 174 engages a slidable spacer pin 178 which in turn engages the rearward side of the operating lever 61. A backstop adjustment screw 179 engages the opposite side of the upper end of the rocker arm 174 to limit counterclockwise rotation of the rocker arm.

The cam 161 is formed with a lobe 181 which rotates to a position under the cam follower 162 as the accessory drive shaft 15 rotates on the frame. As the lobe moves under the cam follower 162 the follower arm 163 is caused to rotate in a counterclockwise direction against the action of the spring 166. If the adjustment screw 177 is in engagement with the bearing block 172 at this time this produces clockwise rotation of the rocker arm 174 and in turn forward movement of the spacer pin 178 and the operator lever 61. Adjustment of the screw 177 back from the block 172 merely reduces the stroke of the movement of the operator lever 61 but does not change the point in the cycle when it reaches the limit of its forward movement. Therefore, the adjustment does not change the timing. A second drive linkage which is a duplication of the linkage up to the lower end of the rocker arm 174 is provided. This linkage is aligned with the linkage just described when viewed in FIGURE 6, so it does not appear directly. This second linkage includes a second cam 182 mounted on the accessory shaft 15 behind the cam 161, as illustrated in FIGURE 7. This cam engages a cam follower 183 on a cam follower arm 184 similar to the follower arm 163. The upper end of the follower arm 184 is connected to the lower end of the rocker arm 174 by a slide block 186 having a structure and connection through a tie bar exactly the same as the connection of the follower arm 163 to the lower end of the rocker arm 174. An adjustment screw 187 is also provided.

The cam 182 is provided with a lobe 188 which passes under the follower 183 and rotates the associated follower arm 184 in a counterclockwise direction and produces clockwise rotation of the rocker arm 174 in the same manner as previously described with the parallel linkage. Since the lower end of the rocker arm 174 is connected to the two slide blocks 169 and 186 by bearing blocks, clockwise rotation of the rocker arm 174 produced by one follower arm and cam does not produce movement of the other follower arm but merely causes one of the bearing blocks to slide along the slide block associated therewith. In effect, this linkage provides two parallel drives for the rocker arm 174 either of which can separately produce actuation of the operating lever 161. Adjustment of the adjustment screws 177 and 187 provides individual adjustment of the amount of movement of the rocker arm 174 produced by each of the cams. The two cams 161 and 182, however, are mounted on the shaft 15 so that the operation produced by each cam is properly timed with the operation of the machine.

The gripping mechanism 21, illustrated in FIGURES 1 and 2, includes a toggle linkage 191 connected between the frame and a clamp element 192 positioned against the movable die 32 and one of the gripper elements 70. A double acting cylinder 193 operates this toggle and is controlled by valves 194 and 195 which are in turn operated by cams 194a and 195a, respectively, mounted on the shaft 45a. Other types of gripping actuators, such as wedges, may be used if desired.

By providing reverse feed for the stock before it is pierced by the punch 22 the forward face of the stock remains behind the face of the dies at the first die station 13 even after the backward extrusion occurring therein. Therefore, no projection is provided to interfere with or obstruct the movement of the shear across the face of the die to the position to receive the stock. This also eliminates any difficulty which would occur when the end of a roll of stock is located between the feed rolls and the die station since the reverse feed would prevent the projection of the stock forward from the die face and eliminate any possibility of jamming.

Figure 8:
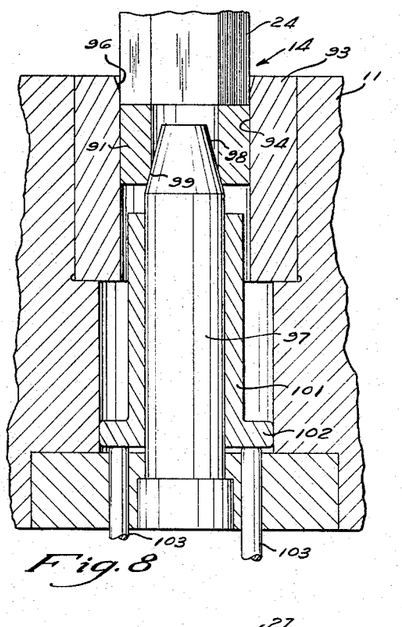
FIGURE 8 is a fragmentary longitudinal section of the second die station illustrating the position of the elements at the completion of the work stroke.

The second die station 14, illustrated in FIGURE 8, includes a tubular die element 93 formed with an internal polygonal passage 94 therethrough and a flaring mouth 96 which operates to guide the blank 91 formed at the first die station into the second die station from the transfer fingers. The passage 94 is proportioned to closely fit the blank 91 so that the exterior surface of the blank is not distorted or worked at this station.

A tool 97 is mounted in the die breast 11 and is formed with a conical end section 98 positioned within the die element 93 and located so that one end of the passage through the blank 91 is upset to form a chamfer 99 in one end of the blank as the blank is pushed into the die by the tool 24 on the header slide 12.

An ejecting sleeve 101 is mounted around the tool 97 for sliding movement relative thereto and is formed with a rearward flange 102 engaged by knockout pins 103 which are moved forward by a cam 105 on the shaft 150 when the blank is ejected from the second die station 14. The timing of the knockout operation and the operation of the transfer mechanism is arranged so that the blank is ejected from the second die station 14 into the transfer mechanism when the tool 24 is spaced back from the die breast 11.

Figure 9:
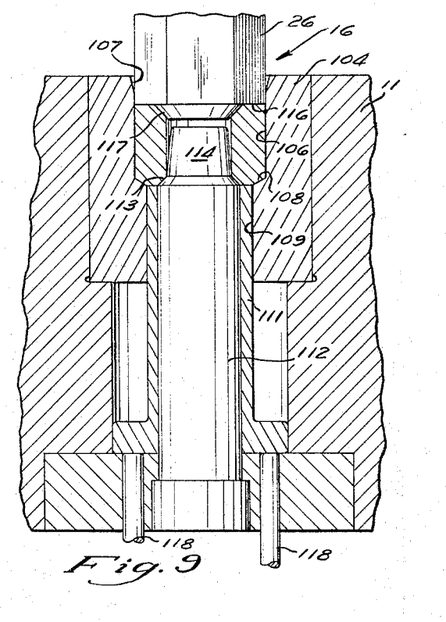
FIGURE 9 is a fragmentary longitudinal section of the third die station illustrating the position of the elements at the completion of the work stroke.

The transfer mechanism transfers the blank from the second die station 14 to the third die station 16, illustrated in FIGURE 9, turning the blank end for end during the transfer operation. The blank is worked at the third die station 16 for forming a chamfer on each end of the bore and crown on one end. To perform this function, a die element 104 mounted on the die breast 11 is formed with a polygonal die cavity 106 extending from a flaring mouth 107 to a conical shoulder 108. The shoulder 108 terminates in a circular bore 109 in which an ejector sleeve 111 is located. A tool 112 mounted in the die breast extends through the ejector sleeve 111 and is formed with a conical shoulder 113 and a tapered projection 114. The lower end of the projection 114 has a diameter substantially equal to the diameter of the bore through the blank so that the inner wall of the blank is supported against distortion during the working occurring at this die station. The tool 26 is formed with a polygonal external surface adapted to closely fit the die cavity 106 and a radial end face 116. Internally of the end face 116, the tool is provided with a tapered nose 117.

As the slide 12 moves forward, the blank positioned by the transfer mechanism in alignment with the third die station is pushed forward into the die by the tool 26. The inner end of the blank is upset by the conical shoulders 108 and 113 so that a chamfer is formed on the inner end of the nut blank by the shoulder 113 and a crown is formed by the shoulder 108. The ejector sleeve 111 is positioned so that its end face extends across between the two shoulders 108 and 113 and is engaged by the blank to smooth the end face of the nut between the crown and the chamfer. The other end of the nut is worked by the nose 117 and the end face 116 so that a chamfer is formed at the entrance of the bore and the end face of the nut is squared by the radial shoulder 116. By working both end faces of the nut in this manner the end faces are squared and are made smooth. As the punch 26 is carried back by the header slide 12, a cam 120 on the shaft 150 operates knockout pins 118 to push the ejector sleeve 111 forward ejecting the blank into the transfer mechanism which transports the blank to the fourth and final die station 17. Here again, the transfer mechanism turn the blank end for end during the transfer operation.

Figure 10:
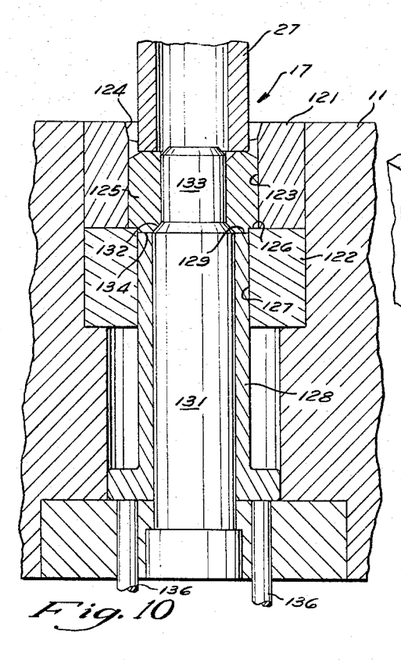
FIGURE 10 is a fragmentary longitudinal section of the fourth die station illustrating the elements at the completion of the work stroke.

Two die elements 121 and 122 are mounted in the die breast 11 at the fourth die station 17 illustrated in FIGURE 10. The first die element 121 is formed with a polygonal die cavity 123 and a flaring guide mouth 124. The second die element 122 is formed with an end face 126 engaging the inner end of the first die element 121 and a through bore 127. The end face 126 projects inwardly from the inner surface of the die cavity 123 to form a shoulder which forms the washer face of the finished nut blank 125. An ejector sleeve 128 extending into the bore 127 terminates at a face 129 inwardly spaced from the end face 126. A tool 131 is mounted in the die breast 11 and extends up through the ejector sleeve 128. The tool 131 is formed with a conical portion 132 and an end projection 133 with a diameter substantially equal to the diameter of the passage in the blank. When the tool 27 presses the blank against the shoulder formed by the end face 126 the washer face is formed and the blank is completed. After the tool 27 is carried back from the die station 17 by the slide, the ejector sleeve 128 is pushed forward by ejector pins 136 which are operated by a cam 135 on the shaft 150 and the finished blank 125 is ejected.

With apparatus incorporating this invention it is possible to manufacture nut blanks which are formed to meet the highest dimensional specification requirements for nut blanks without any scrap. Since all scrap is eliminated, the material costs are reduced to an absolute minimum and the manufacturing costs are minimized.

Although a preferred embodiment of this invention is illustrated, it is to be understood that various modifications and rearrangements of parts may be resorted to without departing from the scope of the invention as defined in the following claims.

What is claimed is:

1. In a machine of the character described, a frame, a die breast on said frame, a slide reciprocable in said frame toward and away from said breast, an open die in said breast, first means connected to clamp said open die for gripping stock and releasing said open die for feeding stock, a station in said die breast spaced from said open die, second means feeding wire stock to said open die while said first means releases such die, a tool on said slide operable to engage the end of stock in said first die and form a blind bore therein when said slide moves to its forward position adjacent said die while said first means operates to clamp said open die, shear means movable into alignment with said first die when said slide moves back from said die, said shear means being proportioned to receive a predetermined length of stock having said blind bore therein, said second means operating to feed said length of stock into said shear means, said shear means thereafter shearing off said length of stock, said shear means carrying said length of stock into alignment with said station as said slide moves forward again, means on said slide engaging said shear means ejecting said length of stock into said station.

2. In a machine of the character described, a frame, a die breast on said frame, a slide reciprocable in said frame toward and away from said breast, an open die in said breast, first means connected to clamp said open die to grip stock and release said open die to permit feeding of stock, a station in said breast spaced from said open die, second means feeding wire stock to said open die, a tool on said slide operable to engage the end of stock in said first die and form a blind bore therein when said slide moves to its forward position adjacent said die while said first means operates to clamp said open die, shear means movable into alignment with said first die when said slide moves back from said die, a gauge on said shear means engageable with the inner end of said blind bore positioning such inner end at a shear plane, said shear means operating to shear away a portion of stock along said shear plane and carry such portion into alignment with said station as said slide moves forward, means on said slide engaging said shear means ejecting said portion of stock into said station.

3. In a machine of the character described, a frame, a header slide reciprocable on said frame, a work station on said frame, stock clamping elements supported on said frame operable to feed stock forward into said work station, reverse feed means adapted to engage the end of the stock in said work station and move such end back therein to a predetermined position, first drive means timed with respect to the header slide reciprocation connected to intermittently move said clamping elements in one direction to forward feed said stock and thereafter allow said clamping elements to move in the opposite direction, and second drive means timed with respect to header slide reciprocation connected to operate said reverse feed means while said clamping elements are allowed to move in said opposite direction.

4. In a machine of the character described, a frame, a header slide reciprocable on said frame, a work station on said frame, a pair of feed rolls supported on said frame operable to feed stock forward into said work station, reverse feed means adapted to engage the end of the stock in said work station and move such end back therein to a predetermined position, first drive means timed with respect to the header slide reciprocation connected to intermittently turn said rolls in one direction to forward feed said stock and thereafter allow said feed rolls to rotate in the opposite direction, and second drive means timed with respect to header slide reciprocation connected to operate said reverse feed means while said feed rolls are allowed to rotate in said opposite direction.

5. In a machine of the character described, a frame, a die breast on said frame, a header slide reciprocable on said frame toward and away from said breast, a first station including cooperating dies and tools on said breast and slide operable to work the end of an elongated piece of stock, shear means including a clamping device for clamping the worked end of said stock, said shear means operating to shear such worked end from said stock, reverse feed means operable to engage the end of the stock and reverse feed the stock back into said dies, and an operating element operable in timed relationship with respect to header slide reciprocation to sequentially actuate said clamping means and said reverse feed means.

6. In a machine of the character described, a frame, a die breast on said frame, a header slide reciprocable on said frame toward and away from said breast, a first station including cooperating dies and tools on said breast and slide operable to work the end of an elongated piece of stock, shear means including a clamping device for clamping the worked end of said stock, said shear means operating to shear such worked end from said stock, reverse feed means operable to engage the end of the stock and reverse feed the stock back into said dies, an operating element operable to sequentially actuate said clamping means and said reverse feed means, and a pair of separate drive means operable to sequentially actuate said element in timed relationship with respect to header slide reciprocation.

7. In a machine of the character described a frame, a header slide reciprocable on said frame, a work station including a die assembly on said frame adapted to receive the end of an elongated piece of stock and a tool on said slide operable to work the end of said stock in said die assembly, shear means proportioned to receive stock worked in said die assembly movable into alignment with said die assembly, feed means operable to feed said stock along said die assembly into said shear means after it is worked by said tool, said shear means thereafter shearing an end portion of worked stock from the remainder of said stock while at least part of said worked stock remains in said die assembly.

8. In a machine of the character described a frame, a header slide reciprocable on said frame, a work station including a die assembly on said frame adapted to receive the end of an elongated piece of stock and a tool on said slide operable to work the end of said stock in said die assembly, said die assembly having a forward face on the side thereof adjacent said slide, shear means proportioned to receive stock worked in said die assembly movable along said face into alignment with said die assembly, feed means operable to feed worked stock past said face into said shear means after it is worked by said tool, said shear means and die assembly cooperating to thereafter shear a portion of the worked stock along said face from the remainder of the worked stock.

9. In a machine of the character described a frame, a header slide reciprocable on said frame, a work station including a die assembly on said frame adapted to receive the end of an elongated piece of stock and a tool on said slide operable to socket the end of said stock in said die assembly, shear means proportioned to receive socketed stock movable into alignment with said die assembly, feed means operable to feed said socketed stock into said shear means after it is upset by said tool, said shear means thereafter shearing socketed stock from the remainder of said stock while supporting said socketed stock against deformation.

10. In a machine of the character described a frame, a header slide reciprocable on said frame, a work station including a die assembly on said frame adapted to receive the end of an elongated piece of stock and a tool on said slide operable to socket the end of said stock in said die assembly, shear means proportioned to receive socketed stock movable in alignment with said die assembly, feed means operable to feed said socketed stock into said shear means after it is upset by said tool, said shear means thereafter shearing socketed stock from the remainder of said stock, said shear means including a support assembly engaging the wall of said socket preventing distortion thereof during shearing.

11. In a machine of the character described a frame, a header slide reciprocable on said frame, a work station including a die assembly on said frame adapted to receive the end of an elongated piece of stock and a tool on said slide operable to work the end of said stock in said die assembly increasing the length of the worked stock, shear means movable into alignment with said die assembly proportioned to receive worked stock and shear such worked stock from the remaining stock while said stock remains in said die assembly, power means operable to first forward feed upset stock into said shear means and second reverse feed said stock until the sheared end thereof is in a predetermined position relative to said die assembly.

12. In a machine of the character described a frame, a header slide reciprocable on said frame, a work station including a die assembly on said frame adapted to receive the end of an elongated piece of stock, and a tool on said slide operable to socket the end of said stock in said die assembly forming a blind bore therein, said die assembly having a forward face on the side thereof adjacent said slide, shear means proportioned to receive said socketed stock movable along said face into alignment with said die assembly, feed means operable to feed socketed stock past said face into said shear means, said shear means including a gauge engaging the bottom of said blind bore positioning such bottom in a shear plane containing said face, said shear means and die assembly cooperating with said gauge to support the walls of said stock on both sides of said face, said shear means thereafter moving laterally with respect to said die assembly shearing away socketed stock along said shear plane.

13. In a machine of the character described, a frame, a die breast on said frame, a slide reciprocable in said frame toward and away from said breast, a die assembly in said breast, means feeding elongated stock to said die assembly, a tool on said slide operable to engage the end of stock in said die assembly and form a blind bore therein when said slide moves to its forward position adjacent said die assembly, shear means movable into alignment with said die assembly when said slide moves back therefrom, a gauge on said shear means engagable with the inner end of said blind bore positioning such inner end at a shear plane, said shear means operating to shear away a portion of stock along said shear plane and also carrying such portion clear of said die assembly.

References Cited by the Examiner

UNITED STATES PATENTS

| 1,929,164 | 10/1933 | Eden | 10—86 |
| 1,969,503 | 8/1934 | Eksergian | 83—251 |
| 2,261,318 | 11/1941 | Wilcox | 10—25 X |
| 2,499,341 | 2/1950 | Wilcox | 10—25 |
| 2,689,360 | 9/1954 | Ware | 10—76 |
| 2,730,731 | 1/1956 | Schaeffer | 10—25 |
| 2,800,997 | 7/1957 | Friedman | 10—49 |
| 2,832,973 | 5/1958 | MacDonald | 10—86 |
| 2,871,492 | 2/1959 | Sciullo | 10—86 |
| 3,117,328 | 1/1964 | Gronemeyer | 10—76 |

FOREIGN PATENTS 21,440 of 1913  9/1914  Great Britain.

ANDREW R. JUHASZ, *Primary Examiner.*